United States Patent Office

3,494,878
Patented Feb. 10, 1970

3,494,878
STAIN RESISTANT WATER-BASED COATING COMPOSITIONS
Richard E. Harren, Doylestown, and Thomas H. Haag, Feasterville, Pa., assignors to Rohm and Haas Company, Philadelphia, Pa., a corporation of Delaware
No Drawing. Filed Nov. 2, 1967, Ser. No. 680,038
Int. Cl. C09d 5/00, 3/76, 3/80
U.S. Cl. 260—2.2    18 Claims

ABSTRACT OF THE DISCLOSURE

An ion exchange resin of anionic or cationic types or a mixture thereof is incorporated in aqueous coating compositions the binder of which comprises as an essential component thereof a dispersed emulsion polymer of vinyl addition type. The coating compositions may be clear or pigmented and by virtue of the ion exchange resin therein they resist staining of the coating films when applied over such substrates as would tend to stain such as cedar, redwood, and mahogany and rusty surfaces such as nail heads or the like.

---

The present invention is concerned with aqueous coating compositions whose binder comprises a vinyl addition polymer of any of the dispersed polymer types that are now used conventionally. The most important of these dispersions used in making water-based paints are polymers, including homopolymers and copolymers, of: (1) vinyl esters of an aliphatic acid having 1 to 18 carbon atoms, especially vinyl acetate; (2) acrylic acid esters and methacrylic acid esters of an alcohol having 1 to 18 carbon atoms, especially methyl acrylate, ethyl acrylate, butyl acrylate, 2-ethylhexyl acrylate, methyl methacrylate, ethyl methacrylate and butyl methacrylate; and (3) mono- and di-ethylenically unsaturated hydrocarbons, such as ethylene, isobutylene, styrene, and aliphatic dienes, such as butadiene, isoprene, and chloroprene.

Poly(vinyl acetate) and copolymers of vinyl acetate with one or more of the following monomers: vinyl chloride, vinylidene chloride, styrene, vinyltoluene, acrylonitrile, methacrylonitrile, one or two of the acrylic and methacrylic acid esters mentioned above are well-known as the film-forming component of aqueous base paints. Similarly copolymers of one or more of the acrylic or methacrylic acid esters mentioned above with one or more of the following monomers: vinyl acetate, vinyl chloride, vinylidene chloride, styrene, vinyltoluene, acrylonitrile, and methacrylonitrile are also more or less conventionally employed in aqueous base paints. Homopolymers of ethylene, isobutylene, and styrene, and coplymers of one or more of these hydrocarbons with one or more esters, nitriles or amides of acrylic acid or of methacrylic acid or with vinyl esters, such as vinyl acetate and vinyl chloride, or with vivnylidene chloride are also used. The diene polymers are generally used in aqueous base paints in the form of copolymers with one or more monomers following: styrene, vinyltoluene, acrylonitrile, methacrylonitrile, and the above-mentioned esters of acrylic acid or methacrylic acid. It is also quite common to include a small amount, such as ½ to 2.5% or more, of an acid monomer in the monomer mixture used for making the copolymers of all three general types mentioned above by emulsion polymerization. Acids used include acrylic, methacrylic, itaconic, aconitic, citraconic, crotonic, maleic, fumaric, the dimer of methacrylic acid, and so on.

These aqueous dispersions may be made using one or more emulsifiers of anionic, cationic, or non-ionic type. Mixtures of two or more emulsifiers regardless of type may be used, except that it is generally undesirable to mix a cationic with an anionic type in any appreciable amounts since they tend to neutralize each other. The amount of emulsifier may range from about 0.1 to 6% by weight or sometimes even more, based on the weight of the total monomer charge. When using a persulfate type of initiator, the addition of emulsifiers is often necessary and this omission or the use of only a small amount, e.g. less than about 0.5%, of emulsifier, may sometimes be desirable from the cost standpoint (elimination of expensive emulsifier), and less sensitivity of the dried coating or impregnation to moisture, and hence less liability of the coated substrate to be affected by moisture, which, for instance, would produce coatings less liable to swelling or softening, particularly when subjected to humid atmospheres. The average particle size or diameter of these dispersed polymers may be from about 0.03 to 3 microns or even larger. The particle size, whenever referred to herein, is the "weight average diameter." This number, expressed in microns, is determined using the ultra-centrifuge. A description of the method can be found in the Journal of Colloid Science 15, pp. 563–572, 1960 (J. Brodnyan). In general, the molecular weight of these emulsion polymers are high, e.g. from about 100,000 to 10,000,000 viscosity average, most commonly above 500,000.

In accordance with the present invention, there is included within the aqueous coating composition containing the dispersed polymer of any of the types mentioned from 1 to 50% by weight of an ion exchange resin of either anionic or cationic types or of both types, such resin being in the form of small particles having a size of up to 25 microns and preferably less than 10 microns. Where the coating must have extremely smooth surface texture, it is generally desirable to use ion exchange resin particles having a size of 1 micron or less such as in the range of 0.5 to 1.0 microns. The proportion of the ion exchange resin stated just above is based on the weight of the dispersed binder contained within the aqueous coating composition on which may consist entirely of one or more of the dispersed vinyl addition polymers mentioned hereinabove generally made by emulsion polymerization or may comprise a mixture of binders including a predominant proportion of such dispersed vinyl addition polymer materials. For example, the binder may comprise more than 50% by weight of the dispersed addition polymer with less than 50% by weight of another binder material such as an alkyd resin, an aminoplast resin, resin-forming polyepoxide, a proteinaceous material, such as casein, or an amylaceous material, such as starch or its derivatives. The binder may, of course, comprise a mixture of at least 50% by weight of one or more of the dispersed vinyl addition polymers with a mixture of two or more of the other binder materials just mentioned, the total of the latter amounting to less than 50% by weight of the total binder.

The small-sized particulate ion exchange resin may be originally formed by suspension polymerization or granular polymerization to provide the preselected size of the bead within the dimensions specified hereinabove. However, instead of making the beads directly in the small-sized range, they may be formed in somewhat larger size than ultimately desired and then comminuted to the intended size by suitable equipment such as ball mills, roll mills, or colloid mills of various types.

The ion exchange resins intended to resist the staining when applied over cedar, redwood, mahogany, and other colored woods which have a strong tendency to stain should be anionic exchange resins in which the functional groups are of amines or preferably quaternized amines. Examples of such ion exchange resins are those prepared from copolymers of styrene and divinyl benzene (in which the divinyl benzene may be in the range of 1 to 25%, preferably 2 to 20% by weight) which are chloromethylated and then reacted to form quaternary ammonium groups therein by means of tertiary amines or into simple amine groups by means of primary or secondary amines. Examples of this type of anion exchange resin are disclosed in U.S. Patents 2,591,573–4; 2,597,439–40; and 2,630,427–9. Anion exchange resins made by condensation procedures may also be used such as those disclosed in 2,402,384. Anion exchange resins of macroreticular, high porosity types are also quite useful. Examples of such resins are disclosed in the Meitzner-Oline application for United States Letters Patent Ser. No. 749,526, filed July 18, 1958.

The anion exchange resins are also useful in water-base paints, such as semigloss paints, which are to be applied as interior paints. When aqueous base paints heretofore used were applied to walls or ceilings which are subjected to high humidity atmospheres, as in bathrooms, shower-rooms, and kitchens, it has been been found that staining matter (which may come from soluble materials, such as a soluble polymer fraction, dispersants, and thickeners, in the point itself) in the plaster substrate is often brought to the surface of the paint coating, apparently as a result of condensation penetrating the paint and leaching soluble staining matter from the coated substrate. It has been found that the coating compositions of the present invention which contain anionic exchange resins inhibit and usually prevent this form of staining. Here again, the quaternary ammonium type of ion exchange resin is generally the most effective.

When it is desired to prevent the penetration of rust from the substrate into the coating, the ion exchange resin is of catonic type either of condensation or vinyl type addition. Examples of the condensation type include the resins obtained by condensing sulfophthalic anhydride in xylene or by condensing sulfophthalein in formaldehyde such as 2,453,687 and 2,456,085. The cation exchange polymers of U.S. Patents 2,597,437–8 are typical addition polymer types that may be used. Cation exchange resins of macroreticular, high porosity types are also quite useful. Examples of such resins are disclosed in the aforesaid patent application Ser. No. 749,526.

It should be understood that the particular character of the ion exchange resin is not of importance except that it must be an anion exchanger for preventing staining by the colored woods mentioned or a cation exchanger to prevent the staining by means of rust. Of course, it is essential that the ion exchange resin be highly crosslinked to prevent its being leached out of the system, but this is characteristic of ion resins. However, as pointed out, it makes no difference whether the ion exchange resins are made by a vinyl addition polymerization or by a condensation type of polymerization. Either type may be used.

The coating compositions may be employed to form clear coatings in which event the composition contains from about 10 to 50% by weight of the binder material and from 1 to 50% by weight of ion exchange resin, this proportion being based on the weight of binder. As stated previously, the particle size of the ion exchange resins may be up to 25 microns and is preferably less than 10 microns. For special uses where it is desired to obtain the smoothest possible coatings, the size of the ion exchange particles is less than 1 micron in diameter and preferably less than the average particle size of the dispersed polymer in the binder. The ion exchange resin that is incorporated depends upon the ultimate use of the coating composition. For preventing the staining from colored woods, an anion exchange resin is employed and generally the quaternary ammonium type anion exchange resin is the most effective. It is not known precisely what action takes place to prevent the bleed-through of stain, but it is believed that the stain is attributable to phenolic compounds such as catechol and apparently such compounds are somehow adsorbed on the resin either by chemical reaction or by ion exclusion or by some variation of hydrogen bonding. Without the ion exchange resins of anionic character in the coating composition, the discoloration caused by the staining components of the wood is evident in the coatings applied initially even when as many as 3 or 4 coatings are placed on the wood substrate. Furthermore, in such instances if the coated substrate is spotted with water (and this may be done manually or it may be the result of a light rain when the painted wood is weathered), the staining components of the wood substrate leach through the coatings and dark spots appear on the surface as a result. By incorporating the anion exchange resins in accordance with the present invention, it has been found surprisingly that both the initial discoloration and the subsequent discoloration that would normally occur on water-spotting are greatly reduced and in most instances completely prevented. The minimum amount of anion exchange resin required in the coating composition that is employed as the primer coat depends upon the particular wood and the particular anion exchange resin since it has been found that the various woods have various staining tendencies and, of course, various anion exchange resins have varying effectiveness. In general, the use of at least 2% of ion exchange resin based on the weight of binder shows a definite improvement and amounts in the range of about 10 to 20% of the ion exchange resin is generally completely effective to prevent staining even when the coating composition is used as a single priming coat under subsequent coats of composition in which no ion exchange resin is present. More than 20% and up to 50% by weight of the ion exchange resin may be employed, but generally the use of more than 20% is not accompanied with any proportionate benefits except in unusual situations.

The vinyl addition polymer binder employed in the system generally has a minimum film forming temperature (MFT) at the prevailing ambient temperatures or below so that there is no need to heat the coating to form a continuous film on the coated substrate. However, the vinyl addition polymer component of the binder may have a higher MFT such as 35 to 50° C. or higher, in which case a plasticizer may be employed in the composition if the coating is to be carried out at normal room temperature or temperatures below the MFT. However, in manufacturing operations where panels of the substrate material, such as strips of siding material of cedar, redwood, or the like, may be transported through an oven in the manufacturing plant, a harder finish may be applied by employing the composition in which the polymer has a higher MFT without a plasticizer or with much less thereof than would be needed if no heat were employed. In this instance, the temperature of the oven through which the coated substrates are passed may be raised to the minimum film forming temperature or higher to assure that a continuous film is produced. In any such operation where heat is employed, the temperature should not exceed that at which the binder or the ion exchange resin contained within the coating composition is decomposed.

The aqueous compositions may contain additional materials (besides the binder and the ion exchange resin) of various kinds to vary the properties and to adapt the compositions for various uses. As mentioned already, plasticizers may be added. In making water base paints, incorporation of pigments and/or dyes is important. The relative proportions of binder to pigment may fall in a wide range, such as from a ratio of 1:20 to 20:1 but for most purposes is from 0.5:1 to 5:1.

Pigment compositions used in interior and exterior house paints usually comprise hiding white pigments, other tints and colors ordinarily being obtained by mixing other colored paint pigments with the white pigments.

Any of the inorganic and organic pigments, pigment lakes, insoluble dyes and other durable coloring matter ordinarily used in formulating durable exterior paints, varnishes, enamels and lacquers can be used in pigmenting the invention paint compositions. Typical useful white hiding pigments are: rutile titanium dioxide, anatase titanium dioxide, zinc oxide, leaded zinc oxide, zinc sulfide, lead titanate, antimony oxide, zirconium oxide, white lead, basic lead silicate, lithopone, titanted lithopone, titanium-barium pigment, titanium-calcium pigment and titanium-magnesium pigment. The titanium dioxide pigments ordinarily are preferred.

While the indicated pigmentation can be solely of hiding prime pigments, it is economically impractical to use solely prime pigments at high pigment volume concentration. As is ordinary practice in paint formulation, the total pigment usually consists of hiding prime pigments extended with well-known pigment extenders such as calcium carbonate, gilders whiting talc, barytes, magnesium silicates, aluminum silicates, diatomaceous earth, china clay, asbestine, silica and mica. The relative proportions of the prime white pigment and the pigment extender in the pigment mixture may be varied widely, but usually the hiding prime pigment is present at a pigment volume concentration which provides the desired paint covering power or hiding and the extender pigment is present in an amount which provides the paint with the desired total pigment volume concentration. Prime pigments and extender pigments range widely in density, but ordinarily white house paints and light tints thereof have a pigment composition whereof the extender pigment is present in the weight proportion of .4 to 4 parts per part of hiding prime pigment.

Pigments can be dispersed in the aqueous paint vericle by any of the well-known techniques of pigment dispersion in paint formulation, such as roller milling, ball or pebble grinding, sand grinding as described in Hochberg U.S. Patent 2,581,414, paddle-mixer dispersion techniques, Werner-Pfleiderer "dough" mixer, mixing and other pigment paste techniques. The pigments can be wet and dispersed in a separate aqueous slurry and then combined with the aqueous dispersion of polymer binder by simple mixing. The order of combining the pigments is not significantly critical. The pigment composition is preferably dispersed in the presence of a water-soluble and swellable colloidal bodying agent and an auxiliary surfactant in addition to the surfactants present in the respective latices to stabilize the polymer dispersions. The auxiliary surfactant for dispersing the pigment composition can be nonionic, anionic, or cationic, preferably of the water-soluble type. The selection of this dispersing surfactant is judicious to provide compatibility and nonreactivity with the dispersion stabilizing surfactants of the respective aqueous dispersions of the paint vehicle. The surfactant for dispersing the pigment composition may be the same or different from the stabilizing surfactants of the polymer binder. Ordinarily a concentration of up to 2% of the auxiliary pigment-dispersing surfactant based on the weight of the pigment composition is adequate, the preferred concentration being 0.1% to 1% on the indicated basis. It is preferred that the total amount of pigment dispersing surfactant and the stabilizing surfactants of the respective latices does not exceed 10% based on the total weight of binder.

The rheological characteristics of the paint can be varied to suit the application needs. The presence of combined carboxylic acid units in the copolymers are helpful in altering the rheological characteristics, particularly when carboxylic substituents are reacted with ammonium hydroxide to form the ammonium carboxylate of the ester copolymer. The aqueous dispersion paint ordinarily is adjusted to an alkaline state of 7.5 to 10 pH with ammonium hydroxide. When the polymer or polymers of the binder do not contain combined carboxylic or carboxylate units, there may be added to the compositions such substances as polyacrylic acid, polymethacrylic acid, water-soluble or water-swellable copolymers of acrylic acid or methacrylic acid, or water-soluble and water-swellable carboxylates of copolymers of these acids to modify the rheological characteristics. Water-soluble cellulose derivatives such as methyl cellulose, carboxymethyl cellulose or hydroxyethyl cellulose, especially methyl cellulose, can also be used for bodying purpose. These materials are used in their ordinary small effective proportions.

Another desirable ancillary component which is preferentially present in the aqueous dispersion paint composition is a volatile water-soluble organic anti-freeze agent to provide the aqueous paint with freeze-thaw stability. Ethylene glycol is especially useful for this purpose at concentrations up to about 5% by weight of the total composition. Other glycols and polyglycols can be used for this purpose.

Aqueous dispersion paint compositions containing surfactants ordinarily foam unless selection of the dispersants is specifically directed to the inherently non-foaming species. Anti-foam agents are ordinarily included in the aqueous paint formulation to minimize foaming. High boiling alcohols, polyglycols, silicone liquids and other anti-foam agents well-known to the coating art can be included in the composition as an ancillary component.

As with conventional paints and enamels formulated from drying oils and from alkyd resins, the paints coalesced from the invention composition may exhibit fungus attack and, therefore, it is further desirable to include a preservative or fungicidal agent in the paint. Any of the well-known preservative agents used in paint formulations can be used in their usual small effective proportions. Phenyl mercury oleate and other phenyl mercurial fungicides are especially useful at active concentrations from 0.05 to 0.3% by weight of the composition.

The paint compositions of this invention ordinarily are adequately flexible so that the external plasticization of the polymer binder is unnecessary. However, ancillary plasticizer can be included in the composition in a minor proportion up to 10% by weight of the polymer binder, preferably no more than 5%. Non-volatile ester plasticizers, for example, the phosphates, such as tricresyl phosphate, and the phthalates, such as dibutyl phthalate, or the polymeric polyester or alkyd plasticizers can be used.

While the total non-volatile content of the aqueous dispersion paint composition, ordinarily designated as the solids content, can vary widely, it is desirable that the non-volatile content be at least 30% by weight in order that a practical amount of paint per coat is applied. The aqueous paint can be satisfactorily formulated in a non-volatile content as great as 70%, but at this concentration thinning with water is ordinarily necessary for satisfactory application. The preferred non-volatile content is from about 40% to 60% by weight.

The viscosity of the aqueous dispersion paint composition also can be varied widely. A Stormer viscosity of about 70 to 100 K.U. at 25° C. is a desirable ready-to-apply brush consistency. This is not a critical characteristic as the paint can be further modified satisfactorily with thixotropy controlling agents to provide the composition with non-drip characteristics with adequate brushout characteristics.

Other auxiliary materials that may be used include: dispersing agents for dispersing and maintaining in a finely divided state the pigments, colors, or extenders, such as aromatic sulfonates condensed with formaldehyde or any of the suitable commercial dispersing agents which are available for this purpose, sequestering agents for controlling polyvalent metal ions sometimes introduced by pigments, colors, or extenders, such as complex alkali metal phosphates or ethylene polyaminoacetates, defoaming agents, including waxes, oils, or mineral spirits, or an alkylphenoxyethanol, fatty acid amides, phosphate esters, or a solution of an amine or amide in an oil; humectants, such as water-soluble gums, ammonium or sodium polyacrylate, glycol laurate, propylene glycol, diethylene glycol, etc.; thickeners, such as water-soluble gums, water-soluble polyacrylates and methacrylates, water-dispersed starches and proteins, etc.; bactericides and/or fungicides, such as borax, pentachlorophenols, or mercury compounds; perfume-like materials, including neutralizing and masking agents, which are used to overcome odors or to impart pleasant and distinctive odors; other resinous materials in dispersed form, such as alkyd resins, drying oils, or latices of styrene or of styrene and butadiene to cheapen and extend the binders of this invention, and auxiliary corrosion-inhibiting agents, such as sodium benzoate, sodium dichromate, guanyl urea phosphate, or sodium nitrate, in an amount of 0.05% to 5%, and most commonly 0.1% to 2% of the dispersed copolymer, etc.

The compositions of the present invention may be of strictly thermoplastic character or they may be of thermosetting character. The compositions may comprise auxiliary components which impart thermosetting qualities thereto. For example, there may be added an aldehyde, such as formaldehyde, an aminoplast or phenoplast, such as the resin-forming condensates of formaldehyde with phenol, urea, N,N'-ethyleneurea, 5-alkyl- or 5-hydroxyethyl-triazones, aminotriazines, such as melamine, as well as the methylated derivatives of these condensates, poly(vic-epoxides) of aliphatic or aromatic types, alkyd resins, i.e. polyesters of polycarboxylic acids (e.g. phthalic, adipic, or sebacic) with a polyol (e.g. ethylene glycol, glycerol, trimethylolethane), and oil-modified types of alkyds containing from 25 to 60% of long chain fatty acid or ester (e.g. soybean oil). The content of these auxiliary materials may be from 1% to 35% by weight of the total weight of vinyl addition polymeric binder material.

When the thermosetting forms of the compositions of the present invention are used, the coating or impregnation may simply be dried at room temperature or whatever exterior temperature may prevail at the time as would be done with the simple thermoplastic types, reliance for development of cure being placed upon ageing for an extended period of time, e.g. several days, weeks, or in some cases, months. On the other hand, the cure of such films may be hastened by drying at elevated temperatures or heating at elevated temperatures (up to 200° C.) for several minutes to a half-hour after drying at room temperatures.

Compositions of the present invention are especially valuable for application to porous materials, e.g. textiles, paper, wood of all types, and especially those having a tendency to stain, masonry, asbestos-cement shingles or siding, surfaces carrying chalky weathered oil-base paint or alkyd paint, and rusty and corroded metal surfaces, e.g. rusty iron, or corroded copper, zinc, and aluminum.

For making water-based paints to be applied by brushing as well as by spraying or roller coating, the preferred formulations generally fall within the scope of the following tabulation, wherein the percentages indicate the solids content.

Material: Percent by weight
Aqueous dispersed binder _____ 10 to 50
Ion exchange resin _____ 0.5 to 10
Pigment composition _____ 15 to 55
Stabilizing and dispersing surfactants ____ 0.1 to 2.5
Bodying or rheology control agent, e.g. sodium polyacrylate _____ 0 to 4.0
Anti-freeze agent, e.g. ethylene glycol ____ 0 to 5
Anti-foam agent, e.g. polypropylene glycol _____ 0 to 2
Fungicidal preservative, e.g. phenyl mercurial salt _____ 0 to 1.0
Ammonium hydroxide—to pH value 7.5 to 10.
Water, balance to make 100%.

The pigment volume concentration is preferably from 25% to 65%. The total of the dispersing and stabilizing surfactants is an amount no greater than 10% based on the weight of water-insoluble material in the binder. The rheology controlling water-soluble organic polymer having combined units of an α,β-monovinylidene monocarboxylic acid can be present in the acidic form or as the water-soluble carboxylate salt, such as the ammonium salt.

In the following examples, which are illustrative of the invention, the parts and percentages are by weight unless otherwise specifically indicated.

EXAMPLE 1

A water-base paint of the present invention (herein designated Paint A) and a corresponding paint lacking the ion exchange beads (herein designated Control A) were prepared by mixing the materials listed in the following Table A in the amounts designated.

TABLE A

| Materials | Pounds Paint A | Pounds Control A |
|---|---|---|
| Water | 30.0 | 30.0 |
| Sodium salt of 50:50 mole ratio maleic anhydride/diisobutylene copolymer (25% in water) | 8.6 | 8.6 |
| Benzyl ether of t-octylphenoxypoly (15) ethoxyethanol | 2.5 | 2.5 |
| Nopco NXZ (defoamer, optional) | 1.0 | 1.0 |
| Ethylene glycol | 20.0 | 20.0 |
| Metasol 57 (preservative, optional) | 1.8 | 1.8 |
| Hydroxyethyl cellulose (15,000 cps. grade, 2.5% solution in water) | 100.0 | 100.0 |
| Titanium dioxide (pigment grade) | 171.0 | 171.0 |
| Calcium carbonate (pigment grade) | 136.5 | 186.5 |
| Mica (325 mesh) | 30.0 | 30.0 |
| (The above ingredients are mixed and ground on a high speed mill at 3800-4500 f.p.m. for 15 minutes; then let down with the following at low speed.) | | |
| Aqueous dispersion (46% solids) of a copolymer of about 46% methyl methacrylate, about 53% butyl acrylate and about 1% methacrylic acid containing about 6%, on polymer, of t-octylphenoxypoly (39) ethoxyethanol | 561.6 | 561.6 |
| Water | 7.2 | 7.2 |
| Pine oil | 3.0 | 3.0 |
| Premix: | | |
| Anion-exchange resin [1] | 50.0 | |
| Water [2] | 214.6 | 10.0 |
| Nopco NXZ (defoamer, optional) | 1.0 | 1.0 |
| NH₄OH (28%) | 1.0 | 1.0 |
| | 1,339.8 | 1,135.2 |
| Pigment volume content, percent | 37 | 35 |
| Weight solids, percent | [2] 40 | 57 |
| pH | 9.4 | 9.5 |
| Viscosity, Krebs units | 80 | 81 |

[1] A cross-linked styrene/4% divinylbenzene copolymer containing about 1 quaternary ammonium group per benzene nucleus and obtained by chloromethylating the cross-linked copolymer and alkylating with trimethylamine as disclosed in U.S. 2,591,573 or 2,591,574, the resin having a bead size of about 0.8 microns.
[2] The ion-exchange resin beads have high water demand and require reduction of paint solids.

The resulting composition is an excellent paint for priming wood surfaces, especially those of cedar, redwood, and others having a tendency to stain paint coatings applied thereto.

Each of these paints (A and Control A) was applied to several panels each of cedar and redwood. Some of the panels were air-dried and then tested for general staining and for water spotting. Others were first topcoated with a single coat of a commercial acrylic latex paint. Then the topcoated panels, after air-drying, were tested for general staining and for water-spotting. The results are as shown in the following Table B.

TABLE B

|  | Primer | | Primer + Topcoat | |
| --- | --- | --- | --- | --- |
|  | General Stain | Water Spot Stain | General Stain | Water Spot Stain |
| Substrate, Cedar: | | | | |
| Paint A Control | Yes | V. heavy | Yes | V. heavy. |
| Paint A | Indefinite [1] | Slight | No | Nil. |
| Substrate, Redwood: | | | | |
| Paint A Control | Yes | V. heavy | Yes | V. heavy. |
| Paint A | Yes (< control). | Heavy | V. slight | V. slight. |

[1] Slight yellow color imparted to paint by addition of ion-exchange beads made it impossible to rate general stain (yellowness of applied paint).

EXAMPLE 2

A water-base paint of the present invention (herein designated Paint B) and a corresponding paint lacking the ion-exchange beads (Control B) were prepared by mixing the materials listed in the following Table C in the amounts designated.

TABLE C

| Materials | Pounds | |
| --- | --- | --- |
|  | Paint B | Control B |
| Water | 120.0 | 120.0 |
| Benzyl ether of t-octylphenoxypoly(15)ethoxyethanol | 3.0 | 3.0 |
| Sodium salt of 50:50 mole ratio maleic anhydride/diisobutylene copolymer (25% in water) | 11.0 | 11.0 |
| Balab 748 (defoamer, optional) | 2.5 | 2.5 |
| Titanium dioxide (pigment grade) | 110.0 | 110.0 |
| $CaCO_3$ (pigment grade) | 160.0 | 160.0 |
| Aqueous dispersion (46% solids) of a copolymer of about 32% methyl methacrylate, about 67% ethyl acrylate and about 1% methacrylic acid containing about 0.4%, on polymer, of sodium lauryl sulfate | 200.0 | |
| Premix: | | |
| Ethylene glycol | 25.6 | |
| Cation-exchange resin [1] | 38.4 | |
| Premix: | | |
| Hydroxyethyl cellulose 4400 cps. grade | | 1.0 |
| Ethylene glycol | | 9.0 |
| Grind above ingredients on high speed mill at 3800 to 4500 f.p.m. for 15 minutes, let down with the following at low speed: | | |
| Aqueous dispersion (46% solids) of a copolymer of about 32% methyl methacrylate, about 67% ethyl acrylate and about 1% methacrylic acid containing about 0.4%, on polymer, of sodium lauryl sulfate | 400.0 | 600.0 |
| $NH_4OH$ (28%) | 3.0 | 3.0 |
| Tributyl phosphate | 5.0 | 5.0 |
| Balab 748 (defoamer, optional) | 2.0 | 2.0 |
|  | 1,080.5 | 1,026.15 |
| Initial viscosity, krebs units | 83 | 78 |
| pH | 9.8 | 9.7 |

[1] A cross-linked copolymer of acrylic acid and 12% divinylbenzene having a bead size of about 1 micron.

This composition is useful as a primer for metals and particularly corroded metals, such as rusty iron or steel.

Paint B and Control B were applied to 4 in. x 12 in. panels of rusty cold-rolled steel and sandblasted rusty cold-rolled steel so as to coat each of them with 4 grams of paint. One panel was allowed to air-dry at ambient conditions. A second panel, immediately after painting, was placed in a humidity box (100% humidity at 100° F.) for 10 minutes, then removed and allowed to air-dry at ambient conditions. When dry (about 1 hour), the panels are rated for rust bleed-through. The results are set out in Table D.

TABLE D.—RUST BLEED-THROUGH RESISTANCE

| Air-Dried Panels | Paint B Control | Paint B |
| --- | --- | --- |
| Substrate: | | |
| Rusty cold-rolled steel panel | Very poor | Fair. |
| Sandblasted rusty cold-rolled steel panel | do | Fair+. |
| Humidity treatment plus air dry substrate: | | |
| Rusty cold-rolled steel panel | do | Fair. |
| Sandblasted rusty cold-rolled steel panel | do | Fair–. |

EXAMPLE 3

Similar results are obtained when Example 1 is repeated except the anion-exchange resin used in Paint A is replaced with 60 pounds of a cross-linked copolymer of 10% glycol dimethacrylate and 90% of diethylaminoethyl acrylate haivng a bead size of about 0.9 micron.

EXAMPLE 4

Effective stain-resistance is similarly obtained when Example 1 is repated except that the anion-exchange resin in Paint A is replaced by 45 pounds of a cross-linked copolymer of 6% divinylbenzene and 94% of vinylpyridinium chloride.

EXAMPLE 5

Results similar to those of Example 1 are obtained when Example 1 is repated except that the anion-exchange resin in Paint A is replaced by a macroreticular cross-linked copolymer of 5% divinylbenzene and 95% stryene obtained by the procedure disclosed in the above-mentioned Ser. No. 749,526 which is subsequently chloromethylated and then quaternized either by trimethylamine or triethylamine as in U.S. 2,291,573 or –4, and then reduced in bead size to about 1 micron by grinding.

EXAMPLE 6

A paint having excellent resistance to rust bleed-through is obtained by repeating Example 2 except that the cation-exchange resin in Paint B is replaced by 36 pounds of a cross-linked copolymer of 15% glycol diacrylate and 85% methacrylic acid.

We claim:
1. An aqueous coating composition comprising a mixture of (1) an aqueous dispersion of a water-insoluble addition polymer selected from the group consisting of vinyl ester polymers, acrylic ester polymers, and vinylhydrocarbon polymers and (2) granules of an ion-exchange resin of either anionic or cationic type having a size in the range of about 0.5 to about 25 microns, the proportion of ion exchange granules, based on polymer weight, being between 1 and 50%.

2. The aqueous coating composition of claim 1 in which said ion-exchange resin is a macroreticular resin.

3. An aqueous coating composition adapted to inhibit staining by wood substrates which normally stain aqueous coating compositions applied thereto comprising a mixture of (1) an aqueous dispersion of a water-insoluble addition polymer selected from the group consisting of vinyl ester polymers, acrylic ester polymers and vinylhydrocarbon polymers and (2) granules of an anionic exchange resin having a size in the rane of about 0.5 to about 25 microns, the proportion of ion exchange granules, based on polymer weight, being between 1 and 50%.

4. A composition according to claim 3 in which the ion-exchange resin contains quaternary ammonium ion-exchange groups.

5. An aqueous coating composition adapted to inhibit staining by rust when applied to corroded metal surfaces which normally stain coating composition applied thereto comprising a mixture of (1) an aqueous dispersion of a water-insoluble addition polymer selected from the group consisting of vinyl ester polymers, acrylic ester polymers, and vinylhydrocarbon polymers and (2) granules of a cationic exchange resin having a size in the range of about 0.5 to about 25 microns, the proportion of ion exchange granules, based on polymer weight, being between 1 and 50%.

6. A composition in accordance with claim 1 in which the proportion of ion-exchange granules is 2 to 20% by weight of the dispersed binder in the composition.

7. A composition in accordance with claim 1 which is an aqueous base paint comprising a pigment dispersed therein.

8. A composition in accordance with claim 3 which is an aqueous base paint comprising a pigment dispersed therein, and the proportion of ion-exchange granules is 2 to 20% by weight of the dispersed binder in the composition.

9. A composition in accordance with claim 4 which is an aqueous base paint comprising a pigment dispersed therein, and the proportion of ion-exchange granules is 2 to 20% by weight of the dispersed binder in the composition.

10. A composition in accordance with claim 5 which is an aqueous base paint comprising a pigment dispersed therein, and the proportion of ion-exchange granules is 2 to 20% by weight of the dispersed binder in the composition.

11. A composition in accordance with claim 5 which is an aqueous base paint comprising a pigment dispersed therein, and the proportion of ion-exchange granules is 2 to 20% by weight of the dispersed binder in the composition and the ion-exchange resin contains carboxylate (in acid or ammonium or alkali metal salt forms) groups.

12. The process of coating woods containing extractable stain producing materials which may be extracted by aqueous coating compositions with resultant staining of the coating, comprising the steps of applying a coating upon said wood of a composition comprising a mixture of (1) an aqueous dispersion of a water-insoluble addition polymer selected from the group consisting of vinyl ester polymers, acrylic ester polymers and vinylhydrocarbon polymers and (2) granules of an anionic exchange resin having a size in the range of about 0.5 to about 25 microns, the amount of said granule being between about 1% and 50% by weight of the dispersed polymer, and curing said coating.

13. A process according to claim 12 in which the ion-exchange resin contains quaternary ammonium ion-exchange groups.

14. The process according to claim 13 in which no more than 20% of said granules, based on polymer weight, is present.

15. The process of claim 14 in which said ion exchange material is a macroreticular resin.

16. The process of coating surfaces of building structures comprising corroded or corrodible ferrous metals, which when coated with aqueous emulsion polymers tend to result in migration of rust stains, comprising the steps of applying a coating upon said building structure surface of a composition comprising a mixture of (1) an aqueous dispersion of a water-insoluble addition polymer selected from the group consisting of vinyl ester polymers, acrylic ester polymers and vinylhydrocarbon polymers and (2) granules of a cationic exchange resin having a size in the range of about 0.5 to about 25 microns, the amount of said granule being between about 1% and 50% by weight of the dispersed polymer, and curing said coating.

17. The process of claim 16 in which said dispersion comprises a pigment dispersed therein, the proportion of ion-exchange granules is no more than 20% by weight of the dispersed binder in the composition, and the ion-exchange resin contains carboxylate (in acid or ammonium or alkali metal salt forms) groups.

18. The process of claim 17 in which said ion exchange material is a macroreticular resin.

References Cited

UNITED STATES PATENTS

| | | | |
|---|---|---|---|
| 2,913,429 | 11/1959 | Floria et al. | 260—29.7 |
| 3,216,948 | 11/1965 | Redding | 252—301.2 |
| 3,245,935 | 4/1966 | Hargreaves et al. | 260—29.6 |

FOREIGN PATENTS

| | | |
|---|---|---|
| 90,297 | 5/1959 | Czechoslovakia. |

OTHER REFERENCES

Rabate: Peintures, pigments, vernis 27, 619–28 (1951) (digest and abstr. supp.).

Barton et al.: Werkstoff u. Korrosion 9, 519–21 (1958).

Brandt: Plaste Kautschuk 11, 251–56, 305–10 (1964) (Chem. Abstr. supplied).

Barton et al.: Chem. phumysl 10, 214–17 (1960) (Chem. Abstr. supplied).

Parker: Principles of Surface Coating Technology, N.Y., Wiley, 1965, pp. 715–17, 721.

Payne: Organic Coating Technology, vol. I., N.Y., Wiley, 1954, pp. 372–77, 552–61.

Payne: Organic Coating Technology, vol. II., N.Y., Wiley, 1961, pp. 1116–19.

WILLIAM H. SHORT, Primary Examiner

M. GOLDSTEIN, Assistant Examiner

U.S. Cl. X.R.

117—62.2, 132, 148; 260—2.1, 29.6, 41